(12) United States Patent
Lin et al.

(10) Patent No.: US 9,069,548 B2
(45) Date of Patent: Jun. 30, 2015

(54) RECONFIGURABLE INSTRUCTION ENCODING METHOD AND PROCESSOR ARCHITECTURE

(75) Inventors: Huang-Lun Lin, Tainan (TW);
Ching-Hsiang Chuang, Taipei (TW);
Shui-An Wen, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 601 days.

(21) Appl. No.: 13/448,659

(22) Filed: Apr. 17, 2012

(65) Prior Publication Data
US 2013/0117536 A1 May 9, 2013

(30) Foreign Application Priority Data
Nov. 7, 2011 (TW) .............................. 100140526 A

(51) Int. Cl.
*G06F 9/30* (2006.01)
*G06F 9/45* (2006.01)

(52) U.S. Cl.
CPC ............ *G06F 9/30156* (2013.01); *G06F 8/443* (2013.01)

(58) Field of Classification Search
CPC combination set(s) only.
See application file for complete search history.

(56) References Cited

U.S. PATENT DOCUMENTS

| | | | |
|---|---|---|---|
| 3,921,143 A | 11/1975 | Woodrum | |
| 4,656,583 A | 4/1987 | Auslander et al. | |
| 5,790,874 A * | 8/1998 | Takano et al. | 713/320 |
| 6,775,787 B2 | 8/2004 | Greene | |
| 6,813,705 B2 | 11/2004 | Duesterwald et al. | |
| 6,817,013 B2 | 11/2004 | Tabata et al. | |
| 7,191,350 B2 * | 3/2007 | Tani | 713/324 |
| 7,299,369 B2 | 11/2007 | Webster et al. | |
| 7,353,411 B2 * | 4/2008 | Mycroft et al. | 713/320 |
| 7,386,844 B2 * | 6/2008 | Heishi et al. | 717/161 |
| 7,480,809 B2 * | 1/2009 | Naik | 713/300 |
| 7,546,476 B2 | 6/2009 | Webster et al. | |

(Continued)

FOREIGN PATENT DOCUMENTS

| | | |
|---|---|---|
| CN | 101232352 | 7/2008 |
| TW | I275994 B | 3/2007 |

OTHER PUBLICATIONS

Athanas, P. etal., Processor Reconfiguration Through Instruction-Set Metamorphosis, 1993, IEEE, 8 pages.*

(Continued)

*Primary Examiner* — Eric Coleman
(74) *Attorney, Agent, or Firm* — McClure, Qualey & Rodack, LLP

(57) ABSTRACT

A reconfigurable instruction encoding method includes the following operations: An instruction distribution of an application is counted, and multiple instruction pairs with higher utilization rates are accordingly found. Multiple instructions of the instruction pairs are duplicately encoded according to multiple reserved sections of an original instruction table, so that the instructions have corresponding reconfigured codes and a reconfigured instruction table extended from the original instruction table and including the reconfigured codes is obtained. A compiler is utilized to generate multiple machine codes according to the reconfigured instruction table and consecutive execution instructions. Hamming distance of the machine codes corresponding to the reconfigured instruction table and the execution instructions are not longer than Hamming distance of the machine codes generated according to the original instruction table and the execution instructions.

10 Claims, 3 Drawing Sheets

(56) References Cited

U.S. PATENT DOCUMENTS

| | | | |
|---|---|---|---|
| 7,552,163 B2 | 6/2009 | Son | |
| 7,707,389 B2 | 4/2010 | Banerjee et al. | |
| 2002/0199083 A1* | 12/2002 | Kao et al. | 712/209 |
| 2005/0010830 A1* | 1/2005 | Webster | 713/320 |
| 2005/0177707 A1* | 8/2005 | Banerjee et al. | 712/226 |
| 2006/0155957 A1 | 7/2006 | Lee et al. | |

OTHER PUBLICATIONS

Ros, M. etal., A Post-Compilation Register Reassignment Technique for Improving Hamming Distance Code Compression, 2005, ACM, 8 pages.*

Kim, S. etal., Opcode encoding for low-power instruction fetch, 1999, Electronic Letters vol. 35, No. 13, 2 pages.*

TW Notice of Allowance dated Apr. 23, 2014.

English language translation of abstract of CN 101232352 (published Jul. 30, 2008).

Tomiyama, H., et al.; "Instruction Scheduling for Power Reduction in Processor-Based System Design;" pp. 1-6.

Lee, C., et al.; "Compiler Optimization in VLIW Instruction Scheduling for Low Power;" ACM Transactions on Design Automation of Electronic Systems; vol. 8; No. 2; Apr. 2003; pp. 252-268.

Petrov, P., et al.; "Low-Power Instruction Bus Encoding for Embedded Processors;" IEEE Transactions on Very Large Integration (VLIS) Systems; vol. 12; No. 8; Aug. 2004; pp. 812-826.

Stan, M.R., et al.; "Bus-Invert Coding for Low Power I/O;" IEEE Transactions on Very Large Integration (VLIS) Systems; vol. 3; No. 1; Mar. 1995; pp. 49-57.

Benini, L., et al.; "Asymptotic Zero-Transition Activity Encoding for Address Busses in Low-Power Microprocessor-Based Systems;" IEEE; 1997; pps. 77-82.

* cited by examiner

RECONFIGURABLE INSTRUCTION ENCODING METHOD AND PROCESSOR ARCHITECTURE

This application claims the benefit of Taiwan application Serial No. 100140526, filed Nov. 7, 2011, the subject matter of which is incorporated herein by reference.

BACKGROUND

1. Technical Field

The disclosure relates in general to a reconfigurable instruction encoding method and a processor architecture.

2. Background

A conventional processor builds in an instruction table, and a compiler transforms to-be-executed instructions into machine codes for the processor to perform corresponding behavior. However, the instruction table is universal, and it is not optimized for any individual application. Consequently, it results in dramatic variations between signal phases of consecutive execution instructions transmitted via the instruction bus after multiple execution instructions of one single application are compiled and assembled. The dramatic variations induce rapid changes of the signal logic level at a CMOS circuit input terminal, and leads to huge power consumption.

If the processor is still during the design level, the instruction table can be re-designed to be more suited to some applications. However, for a design-completed processor, a re-designed instruction table will cause compatibility problems, so that the machine codes from the compiler can not be executed by the processor designed based on an original instruction table. Besides, the applications develop rapidly and variously, the built-in and unchangeable instruction table might not meet the performance of all the newly-developed applications.

SUMMARY

The disclosure is directed to a reconfigurable instruction encoding method and a processor architecture, duplicately encoding instruction pairs with higher utilization rates according to reserved sections of an original instruction table.

According to one embodiment of the present disclosure, a reconfigurable instruction encoding method, applied to an instruction encoding system, including the followings is provided. An instruction distribution of an application is counted, and multiple instruction pairs with higher utilization rates are accordingly found. Multiple instructions of the instruction pairs are duplicately encoded according to multiple reserved sections of an original instruction table, so that the instructions have corresponding reconfigured codes and a reconfigured instruction table extended from the original instruction table and including the reconfigured codes is obtained. A compiler is utilized to generate multiple machine codes according to the reconfigured instruction table and consecutive execution instructions. Hamming distance of the machine codes corresponding to the reconfigured instruction table and the execution instructions are not longer than Hamming distance of the machine codes generated according to the original instruction table and the execution instructions.

According to another embodiment of the present disclosure, a processor architecture is provided. The processor architecture includes an instruction fetch unit, an instruction re-encoding unit, a multiplexer, an instruction decoding unit and an execution unit. The instruction fetch unit obtains multiple machine codes corresponding to consecutive execution instructions of an application. The instruction re-encoding unit loads a reconfigured instruction table, determines whether the machine codes are multiple reconfigured codes according to the reconfigured instruction table, and transforms the reconfigured code into an original machine code corresponding to the execution instruction when the machine code is the reconfigured code. The multiplexer is coupled to the instruction fetch unit and the instruction re-encoding unit, and outputs the original machine code when the machine code is the reconfigured code. The instruction decoding unit decodes the original machine code to be the corresponding execution instruction. The execution unit executes the execution instruction. The reconfigured instruction table includes an original instruction table and the reconfigured codes, and the reconfigured codes are obtained by duplicately encoding multiple instructions of multiple instruction pairs, with higher utilization rates in the application, according to multiple reserved sections of the original instruction table.

The disclosure will become apparent from the following detailed description of the preferred but non-limiting embodiments. The following description is made with reference to the accompanying drawings.

DETAILED DESCRIPTION OF THE EMBODIMENTS

The disclosure proposes a reconfigurable instruction encoding method and a processor architecture, duplicately encoding instruction pairs with higher utilization rates according to reserved sections of an original instruction table, thus might capable of reducing bit switching rates of instruction busses and possibly achieving low power consumption.

Figure 1A:
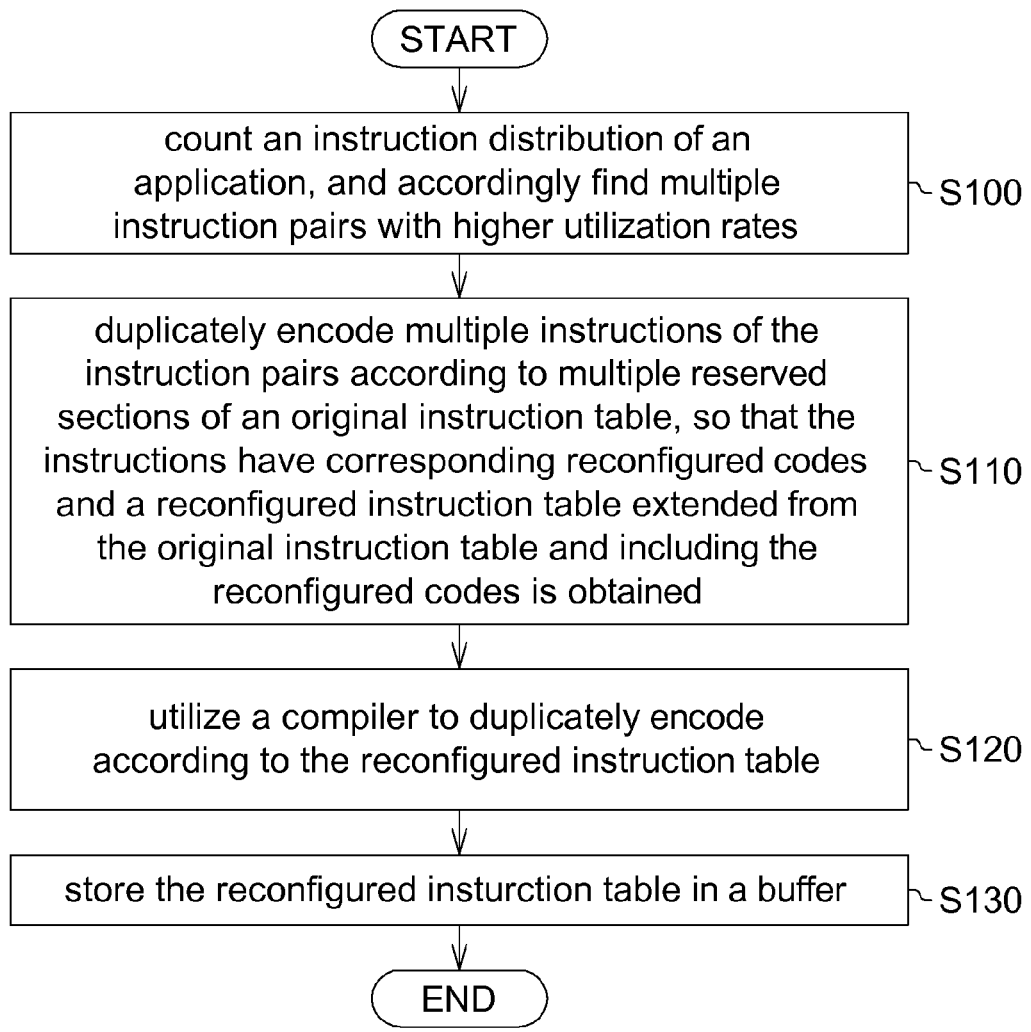
FIG. 1A shows a flow chart of a reconfigurable instruction encoding method according to an embodiment.

Referring to FIG. 1A, a flow chart of a reconfigurable instruction encoding method according to an embodiment is shown. The reconfigurable instruction encoding method is applied to an instruction encoding system, such as a processor architecture. In step S100, an instruction distribution of an application is counted, and multiple instruction pairs with higher utilization rates are accordingly found. A compiler or a program may be utilized to implement the step of counting. In Step S110, multiple instructions of the instruction pairs are duplicately encoded according to multiple reserved sections of an original instruction table, so that the instructions have corresponding reconfigured codes and a reconfigured instruction table extended from the original instruction table and including the reconfigured codes is obtained. The duplicately encoding is not limited to be one-on-one, and one instruction may be duplicately encoded to obtain one or more corresponding configured codes. The compiler builds in the original instruction table.

General processors reserve multiple reserved sections or reserved bits in the original instruction table because of bit numbers or expansion issues when performing instruction encoding. The instructions of the instruction pairs with higher utilization rates respectively decide the reserved sections to fill according to a topology-relationship description there between, and then the corresponding reconfigured codes are generated. However, how the instructions fill the reserved sections is not limited. The reconfigured codes of the instructions fill the reserved sections, so that the reconfigured instruction table of the disclosure can keep the multiple reconfigured codes.

In step S120, the compiler is utilized to duplicately encode according to the reconfigured instruction table. Step S120 substantially utilizes the compiler to generate multiple machine codes according to the reconfigured instruction table and consecutive execution instructions after duplicately encoding. Hamming distance of the machine codes corresponding to the reconfigured instruction table and the execution instructions are not longer than Hamming distance of the machine codes generated according to the original instruction table and the execution instructions. During the generation process of the machine codes, the compiler or an assembler substantially selects an optimum encoding method of the execution instructions with the reconfigured codes to make the Hamming distance of any two consecutive execution instructions be shortest.

Take 32-bit fixed-length codes of the Microprocessor without Interlocked Pipeline Stage (MIPS) architecture as being exemplified. In the code, a 6-bit opcode and a 6-bit function-code are instruction related. Assume that the opcode is set to be "000000", the instruction is REG format, and the function-code is to select a to-be-performed operation. The instruction table of the MIPS architecture is shown in Table 1, and the shaded regions are the reserved sections.

TABLE 1

|     | 000  | 001   | 010  | 011  | 100  | 101 | 110  | 111  |
|-----|------|-------|------|------|------|-----|------|------|
| 000 | sll  |       | srl  | sra  | sllv |     | srlv | srav |
| 001 | jr   | jalr  | add  |      |      |     |      |      |
| 010 | mfhi | mthi  | mflo | Mtlo |      |     |      |      |
| 011 | mult | multu | div  | divu |      |     |      |      |
| 100 | add  | addu  | sub  | subu | and  | or  | xor  | nor  |
| 101 |      |       | slt  | sltu |      |     |      |      |
| 110 |      |       |      |      |      |     |      |      |
| 111 |      |       |      |      |      |     |      |      |

It can be observed in Table 1 that, in the instruction table, the original machine code of the instruction mult is "011000", the original machine code of the instruction add is "100000", the original machine code of the instruction srl is "000010". Take the multiplying, adding and then quantifying as being exemplified. Hamming distances of the original machine codes "011000→100000→000010" are 3 plus 2 equaling 5. Now the instruction add is reconfigured, and an empty reserved section in the instruction table is repeatedly assigned to the instruction add, such as "001010" shown in Table 1. Then the machine codes of the multiplying, adding and then quantifying change to "011000→001010→000010", and Hamming distance of the machine codes are 2 plus 1 equaling 3, thus saving 40 percentages of signal transition variations. In step S120, the compiler or the assembler substantially generates the machine codes with the least variations between signal phases of consecutive execution instructions transmitted via the instruction bus.

After step S120, proceeding to step S130, the reconfigured instruction table corresponding to the application is stored in a buffer. In the disclosure, the buffer may substantially stores many reconfigured instruction table, each of which corresponds to one single application and is obtained by the above steps.

Figure 1B:
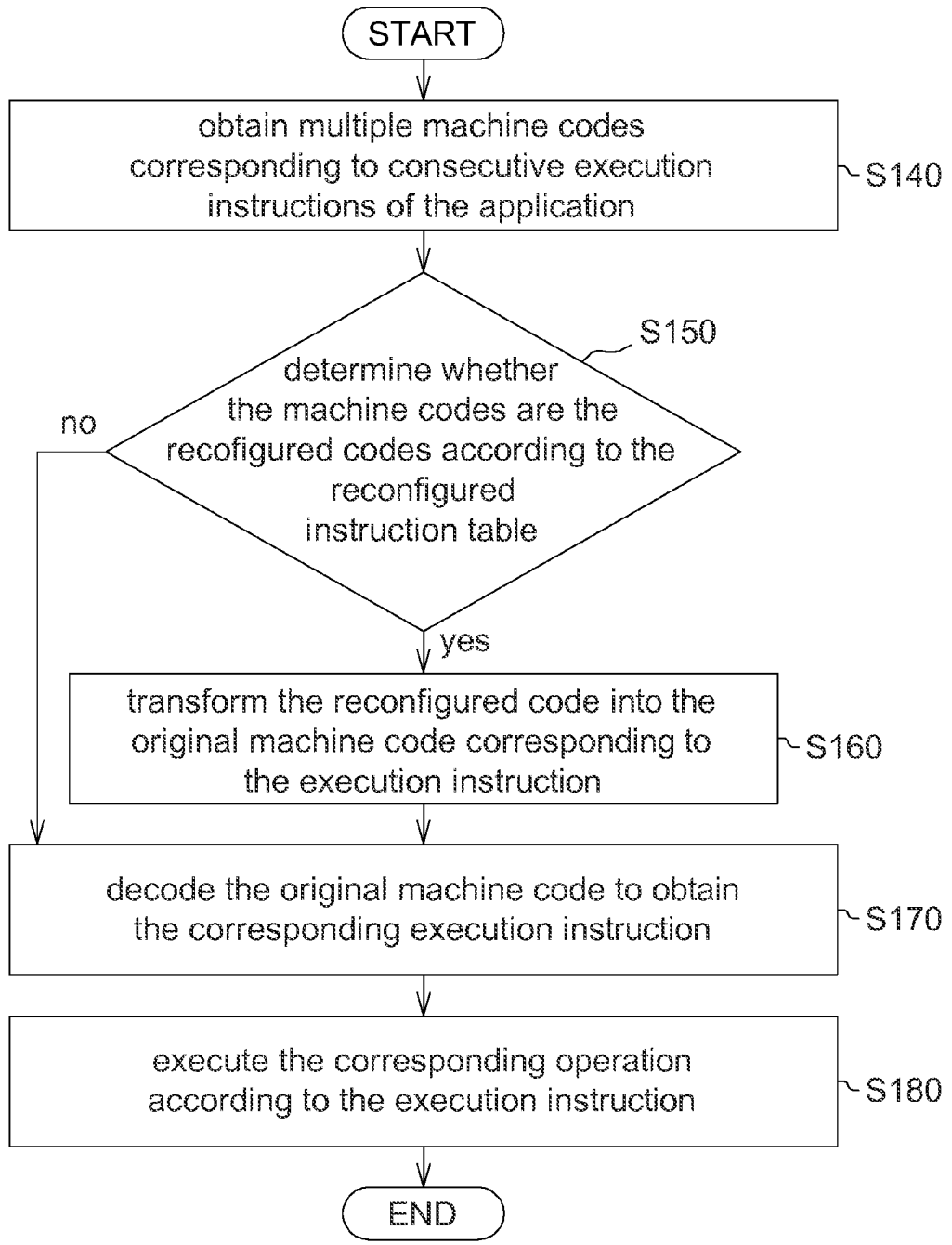
FIG. 1B shows a flow chart of a reconfigurable instruction encoding method according to anther embodiment.
Figure 2:
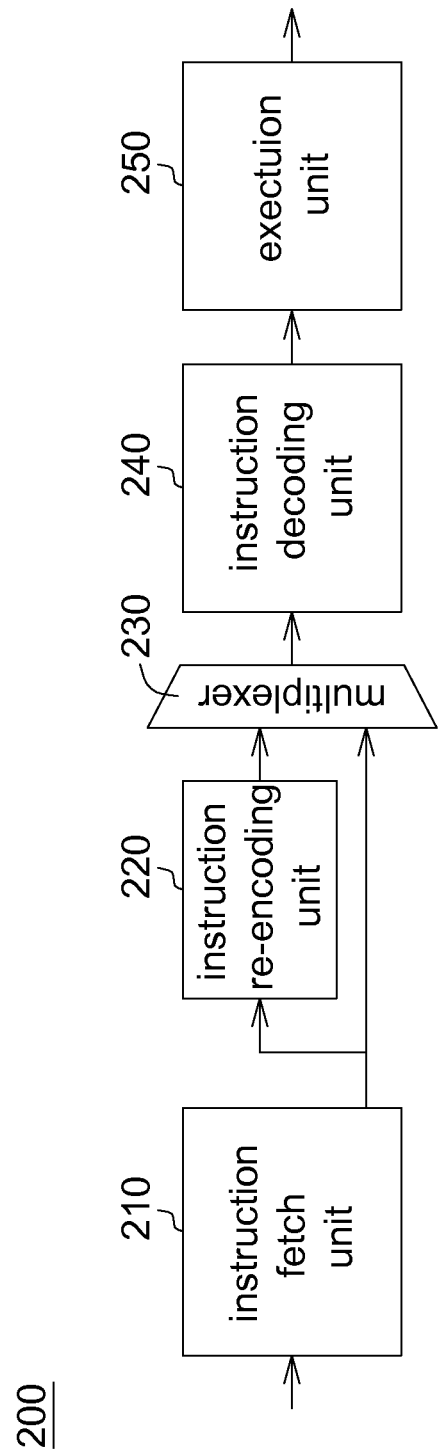
FIG. 2 shows a schematic illustration showing a processor architecture according to an embodiment.

Referring concurrently now to FIG. 1B and FIG. 2, FIG. 1B shows a flow chart of a reconfigurable instruction encoding method according to anther embodiment, and FIG. 2 shows a schematic illustration showing a processor architecture according to an embodiment. In FIG. 2, take the processor architecture 200 including an instruction fetch unit 210, an instruction re-encoding unit 220, a multiplexer 230, an instruction decoding unit 240 and an execution unit 250 as being exemplified, but it is not limited thereto.

In step S140, the instruction fetch unit 210 obtains multiple machine codes corresponding to consecutive execution instructions of the application. That is, the instruction fetch unit 210 of the processor architecture 200 substantially fetches multiple execution instructions and obtaining the corresponding machine codes from a memory. In step S150, the instruction re-encoding unit 220 loads the reconfigured instruction table corresponding to the application from the buffer, and determines whether the machine codes are the reconfigured codes according to the reconfigured instruction table. When the machine code is the reconfigured code, in step S160, the instruction re-encoding unit 220 transforms the reconfigured code into the original machine code corresponding to the execution instruction, and then transmits the original machine code to the instruction decoding unit 240. When the machine code is not the reconfigured code, it means that the machine code is the original machine code and is directly transmitted to the instruction decoding unit 240.

In step S170, the instruction decoding unit 240 also builds in the original instruction table, hence it can decode the received original machine code to obtain the corresponding execution instruction. In step S180, the execution unit 250 performs the corresponding operation according to the execution instruction.

The reconfigurable instructions encoding method and processor architecture proposed in the above embodiments of the disclosure count the instruction pairs with higher utilization rates of the application, and duplicately encode instruction pairs according to the reserved sections of the original instruction table. In principle, the proposed reconfigurable instruction encoding method and the processor architecture have the compatibility to be compatible with an instruction set architecture (ISA) of the original instruction table. In principle, it could decreases the signal transition variations, thus reducing bit switching rates of instruction busses and suitable to various applications needing low power consumption.

While the disclosure has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reconfigurable instruction encoding method, applied to an instruction encoding system, comprising:
    counting an instruction distribution of an application, and accordingly finding a plurality of instruction pairs with higher utilization rates; and repeatedly encoding a plurality of instructions of the instruction pairs according to a plurality of reserved sections of an original instruction table, so that each of the instructions has an original code and a reconfigured code and a reconfigured instruction table extended from the original instruction table and including the reconfigured codes is obtained; and generating a plurality of machine codes according to the reconfigured instruction table and a plurality of consecutive execution instructions;

wherein a Hamming distance of the machine codes generated according to the reconfigured instruction table and the execution instructions are not longer than that generated according to the original instruction table and the execution instructions.

2. The reconfigurable instruction encoding method according to claim 1, wherein the instructions of the instruction pairs are respectively filled in the reserved sections to obtain the reconfigured codes.

3. The reconfigurable instruction encoding method according to claim 1, further comprising:

storing the reconfigured instruction table into a buffer;

obtaining the machine codes by a processor;

determining whether the machine codes are the reconfigured codes according to the reconfigured instruction table; and transforming the reconfigured codes into the original codes corresponding to the execution instructions when the machine codes are the reconfigured codes; and decoding the original codes to be the corresponding execution instructions and executing the execution instructions.

4. The reconfigurable instruction encoding method according to claim 3, wherein when the machine codes are not the reconfigured codes, the machine codes are the original codes corresponding to the execution instruction, and the processor decodes the original codes to be the execution instructions and executes the execution instructions.

5. The reconfigurable instruction encoding method according to claim 1, wherein the step of counting is implemented by a compiler or a device storing a program.

6. The reconfigurable instruction encoding method according to claim 1, wherein the step of repeatedly encoding is implemented by a compiler or a device storing a program.

7. A processor, comprising:

an instruction fetch unit for obtaining a plurality of machine codes corresponding to a plurality of consecutive execution instructions of an application;

an instruction re-encoding unit for loading a reconfigured instruction table, determining whether the machine codes are a plurality of reconfigured codes according to the reconfigured instruction table, and transforming the reconfigured codes into a plurality of original codes corresponding to the execution instructions when the machine codes are the reconfigured codes;

a multiplexer, coupled to the instruction fetch unit and the instruction re-encoding unit, for outputting the original codes when the machine codes are the reconfigured codes;

an instruction decoding unit for decoding the original codes to be the corresponding execution instructions; and an execution unit for executing the execution instructions;

wherein the reconfigured instruction table includes an original instruction table and the reconfigured codes, and the reconfigured codes are obtained by repeatedly encoding a plurality of instructions of a plurality of instruction pairs, with higher utilization rates in the application, according to a plurality of reserved sections of the original instruction table.

8. The processor according to claim 7, wherein a Hamming distance of the machine codes generated according to the reconfigured instruction table and the execution instructions are not longer than that generated according to the original instruction table and the execution instructions.

9. The processor according to claim 7, wherein the instruction re-encoding unit loads the reconfigured instruction table from a buffer.

10. The processor according to claim 7, wherein when the machine codes are not the reconfigured codes, the multiplexer outputs the original codes to the instruction decoding unit, the instruction decoding unit decodes the original codes to be the corresponding execution instructions, and the execution unit executes the execution instructions.

* * * * *